United States Patent Office 3,118,784
Patented Jan. 21, 1964

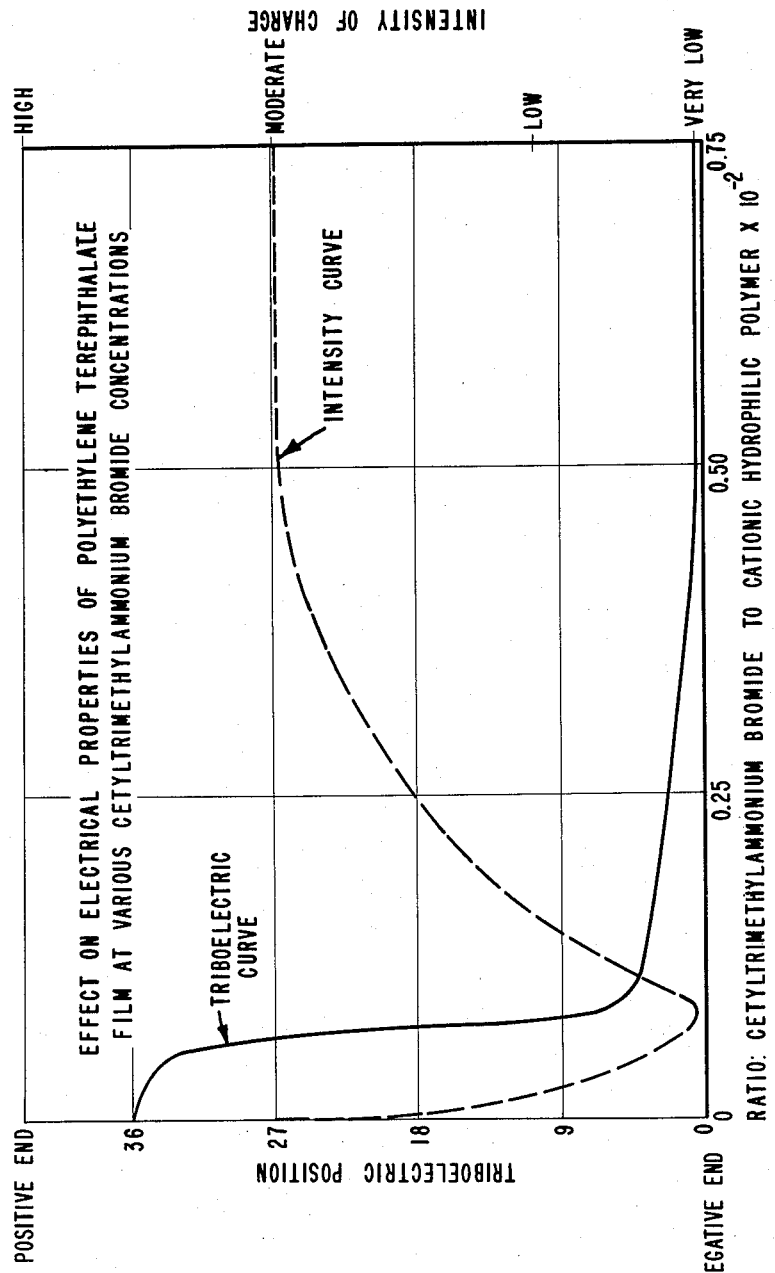

3,118,784
REDUCING STATIC-ELECTRICITY BUILDUP ON A SYNTHETIC RESIN BY APPLYING A DISCONTINUOUS NITROGEN CONTAINING POLYMER THEREON
Vincent Joseph Webers, Red Bank, N.J., assignor to E. I. du Pont de Nemours and Company, Wilmington, Del., a corporation of Delaware
Filed Feb. 13, 1961, Ser. No. 88,835
17 Claims. (Cl. 117—102)

This invention relates to a process for altering the electrical properties of the surface of a shaped article. More particularly it relates to such a process wherein the surface of said shaped article contains a plurality of anionic or anion-forming groups. Still more particularly it relates to a process for providing the surface of a shaped article containing a plurality of anionic or anion-forming groups with low static susceptibility. This invention also relates to the electrically altered articles so formed.

Shaped articles prepared from various synthetic polymeric materials, which while useful as fibers, filaments, ribbons, films, etc., are extremely susceptible to surface build-up of static electricity. The static electricity build-up makes such articles difficult to use, particularly under low humidity conditions. Many attempts have been made to prevent such static electricity build-up by coating antistatic layers onto adhesive surfaces of the shaped article. Generally, the antistatic materials are coated to an appreciable thickness whereby the antistatic material functions by increasing the conductivity of the article or by furnishing a new surface having a position in the triboelectric series close to the position of other surfaces which the shaped article may be expected to contact.

"Triboelectric series" is defined in Hackh's Chemical Distionary, third edition, McGraw-Hill Book Company, New York, 1944, as "An arrangement of substances in a list so that any substance, when rubbed by a substance following it in the list, becomes positively electrified: (+) asbestos, hair (rabbit's fur), glass, wool, calcite, silk, cotton, magnalium, wood, amber, slate, ebonite, sulfur, celluloid, rubber, (—)." Such appreciably thick antistatic coatings are satisfactory for many products, e.g., as are disclosed in Walles U.S. Patents 2,832,696, 2,832,697, 2,832,698 and 2,832,699.

The Walles patents relate to methods of applying antistatic agents to shaped articles of polyethylene and substituted, non-aromatic hydrocarbon polymers. The shaped article compositions are surface-treated by sulfonating agents and subsequently treated with antistatic agents some of which contain both hydrophobic and hydrophilic groups. Other antistatic agents disclosed by Walles as useful are hydrophilic compounds which are free from hydrophobic groups and contain a functional basic atom, preferably nitrogen, in their molecular arrangement. The Walles patents disclose that antistatic activity is obtained by improving the conductivity of the surface of the shaped article. Such antistatic improvement is generally obtained by immersing the sulfonated article in an aqueous solution of the antistatic material thereby introducing appreciable amounts of the antistatic material into the surface of the article. Walles desires the introduction of greater amounts of antistatic agents to yield products having greater degrees of antistatic characteristics.

While, as mentioned above, appreciably thick antistatic coatings are satisfactory for many products, for other products, in particular photographic products, it is impractical and costly to apply an antistatic coating of appreciable thickness. This is so because known, transparent, conductive materials that are suitable for application to photographic film bases are humidity sensitive. The conductivity of a coated film is approximately a logarithmic function of the humidity, that is, Log resistance=$K_1 \times RH + K_2$ where $K_1$ and $K_2$ are constants which vary according to the particular base material and RH is the percent relative humidity. If the coating is thin, adequate static protection is afforded at moderate to high humidities but not at low humidity, e.g. 20% relative humidity. The coating weight would have to be increased markedly to secure adequate conductivity at low humidity. A photographic film bearing this heavier coating would have to have the coating removed before splicing. Furthermore, known materials designed to protect against static by providing a new surface of a preferred position in the triboelectric series, previously defined, can reduce static generated by contact with some but not with all types of surfaces. Static protection is afforded only when two contacting surfaces have positions close to one another in the triboelectric series.

An object of this invention is to provide a novel process for altering the electrical properties of the surface of a shaped article. Another object is to provide such a process wherein the static susceptibility of shaped articles is appreciably reduced. Still another object is to provide such a process wherein the static protection of said shaped articles is effective at low relative humidities. Yet another object is to provide such a process wherein the static protection is provided by a polymeric, cationic, hydrophilic, antistatic agent. A further object is to provide a shaped article obtained by the process which has static protection that is effective when the protected surface is contacted by other surfaces occupying a wide variety of positions in the triboelectric series. Still other objects will be apparent from the following description of the invention.

The above objects are attained by a novel process for altering the electrical properties of a surface of a shaped article, said surface having a plurality of anionic or anion-forming groups, which comprises adsorbing to said surface a cationic, hydrophilic polymer containing a basic nitrogen atom and capable of forming a salt with said anionic group, and washing said treated surface with an aqueous medium, e.g., water, water-miscible solutions, until non-absorbed polymer and weakly adhering polymer is essentially removed and drying.

The layer of adsorbed cationic polymer remaining after washing is believed to be a monomolecular layer, but it may not completely cover the surface of the shaped article with a layer of the polymeric adsorbent one molecule thick. It is believed, however, that adsorption has occurred to the extent that essentially all the active sites on the surface of the shaped article have reacted with groups present in the adsorbent polymer. After washing, there are essentially no free molecules of adsorbent polymeric material which are not attached to anionic groups in the surface of the shaped article.

The time of washing the treated surface to remove the excess and weakly adhering polymer is not critical. In general, a very short washing period is adequate, e.g., 1 or 2 seconds up to about 30 seconds. The non-adsorbed cationic polymeric material is, to a large extent, removed rapidly and continued washing does not remove much more of the polymeric material. While longer washing times can be used, it has been found that washing with undue vigor or for extreme periods of time, e.g., several hours, may have a deterimental effect on the treated shaped article because portions of the absorbed polymeric material may be removed thereby. A simple test to determine that the washing period is sufficient is to test a sample of the washed shaped article for electrical properties by a method to be hereinafter described. When changes of the electrical properties are no longer observable, from one wash period to the next, the washing is complete.

A preferred process for altering the electrical properties of the surface of a film, said film surface having a plurality of carboxylic groups, comprises adsorbing to said surface a polyamine, cationic, hydrophilic polymer of the formula:

$$H[-X-CH_2CH_2-(OCH_2CH_2)_m-O-R-O-(CH_2CH_2O)_n-CH_2CH_2]_p-X-H$$

wherein —R— is a divalent radical taken from the group consisting of unsubstituted alkylene radicals, an alkylene radical substituted with at least one group taken from the class consisting of alkyl of 1 to 4 carbon atoms, e.g., methyl, ethyl, propyl, butyl; alkoxy of 1 to 3 carbon atoms, e.g., methoxy, ethoxy, propoxy; aryl of 6 to 12 carbon atoms, e.g., phenyl, tolyl, naphthyl, biphenyl, etc.; $R_1CO-$ where $R_1$ contains 1 to 3 carbon atoms; $R_1COO-$ where $R_1$ contains 1 to 3 carbon atoms; hydroxyl, chlorine and bromine and an alkylene radical interrupted with nitrogen, oxygen or sulfur and a radical of the formula

and

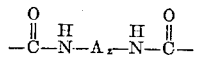

wherein A is a hydrocarbon radical of 1 to 10 carbon atoms and $z$ is a cardinal number of 0 and 1, —X— is a member of the class consisting of amino nitrogen and divalent hydrocarbon radicals of 2 to 10 carbon atoms terminating in amino nitrogen, $m$ and $n$ are integers ranging from 3 to 40 and $p$ is an integer no greater than about 10, and subsequently washing said adsorbed surface with an aqueous solution and drying. Suitable divalent hydrocarbon radicals —R— include: methylene, ethylene, propylene, isopropylene, butylene, isobutylene, phenylene, vinylene, etc. Suitable radicals of the formula

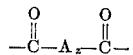

include: malonyl, succinoyl, adipoyl, terephthaloyl, etc. Suitable radicals of the formula

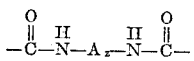

include: ethylenediamine dicarbonyl, p-phenylenediamine dicarbonyl, hexamethylenediamine dicarbonyl, etc.

Particularly preferred cationic, hydrophilic polymers useful in the process are polyamines of the formula:

$$H[-X-CH_2CH_2-(OCH_2CH_2)_q-OCH_2CH_2]_p-X-H$$

wherein —X— is a member of the class consisting of

and

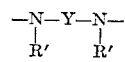

wherein —R′ is a member of the class consisting of hydrogen, lower alkyl (i.e., an alkyl radical containing less than about 8 carbon atoms in its longest chain) and amino lower alkyl and —Y— is a divalent aliphatic hydrocarbon of up to 8 carbon atoms or such a hydrocarbon radical interrupted with at least one intralinear imine or alkyl-substituted imine linkage, and $q$ is a number from about 6 to about 40.

This process gives a surface which shows only slight charge intensities when brought into contact at low relative humidity, e.g., 20% relative humidity, with a variety of surfaces covering a broad range of triboelectric positions. This process is particularly useful in providing static protection for films and especially photographic film base. When photographic films are treated, the treatment can be made permanent to photographic processing by incorporation of a crosslinking agent with the cationic hydrophilic polymers. While solvent soluble crosslinking materials can be used with the cationic hydrophilic polymers, preferably such crosslinking agents are water soluble. Suitable such agents are described in British specification 780,288, dated July 31, 1957. A preferred crosslinking agent is a polyepoxide, e.g., a polyepoxide prepared by condensing epichlorohydrin with a polyol such as glycerine or a polyethylene glycol of up to 32 carbon atoms. Other useful crosslinking agents include formaldehyde, polyethylene glycol diiodide and polyethylene glycol dibromide. The ratio of the cationic, hydrophilic polymer to the crosslinking agent ranges from 1 to 1 to 20 to 1 parts by weight. An especially preferred range is from 2 to 1 to 8 to 1 parts by weight.

The crosslinking agent can be reacted with the cationic, hydrophilic polymer prior to or after adsorption to the film surface. In the treating of film, e.g., photographic film base, best results are obtained when the polymer and the crosslinking agent are at least partially reacted before being adsorbed to the film surface. The chemical reaction can be brought about prior to adsorption by heating or by other means.

A particularly preferred process for altering the electrical properties of the planar surface of a film having a plurality of carboxylic groups by providing said surface with a low static susceptibility comprises adsorbing to said surface a mixture comprising (1) a cationic, hydrophilic polymer of the formulas described above (2) a crosslinking agent taken from the group consisting of a polyepoxide, formaldehyde, polyethylene glycol diiodide, and polyethylene glycol dibromide, and (3) an alkyl quaternary ammonium compound, washing away the excess of said mixture with a solvent for said mixture and drying.

The above treatment results in what is believed to be an extremely thin, e.g., a "monomolecular," layer of the mixture being adsorbed to the film surface. To aid in determining that the antistatic material adsorbed to the surface of a shaped article is present in an extremely thin layer, a standard resistivity test such as is described in "ASTM Standards 1952," part 6, pages 1031–1032, American Society for Testing Materials, Philadelphia, Pa. (1953), is useful. It has been found, however, that such measurements of resistivity are useful in determining the existence of the thin layer only when the adsorbed polymeric material has appreciable conductivity when in the form of a layer of appreciable thickness, e.g., 0.1 or more milligrams of polymeric material per square decimeter of coated surface. Most of the cationic polymeric materials useful in this invention have appreciable conductivity when the layer thickness increases and therefore considerable differences in surface resistivity between the thin layer and layers of appreciable thickness can be readily determined. For example, a layer of material of appreciable thickness may impart a specific resistivity of $1 \times 10^{11}$ ohms per square or less at 40% relative humidity and normal room temperature, while a thin layer of the same material wherein all non-adsorbed material is removed may impart a specific resistivity of $1 \times 10^{14}$ ohms per square or more under similar testing conditions. If the differences in resistivity can be determined for a particular cationic polymeric material as described above, these measurements would be useful in determining the length of time required for an adequate wash. Gelatin is an example of a material which cannot be tested in the above-described manner because it has low conductivity even in thicker layers. As a result, the surface resistivity measurements for the thin layer and layers of appreciable thickness of gelatin are not easily differentiated.

In actual practice, to determine the optimum of the alkyl quaternary ammonium compound be used in the adsorbent mixture to give a surface having a minimum static susceptibility, the following test can be made. The cationic hydrophilic polymer and crosslinking agent are mixed in a ratio of between 2 to 1 and 8 to 1 parts by weight. At least three sample portions of the above adsorbent mixture of cationic polymer and crosslinking agent are taken and to each is added a different amount of the quaternary ammonium compound but within the concentration range of about 0.03 to 0.15% by weight based on the cationic, hydrophilic polymer concentration. Film samples are immersed in each portion of the adsorbent mixture, the film surfaces are washed and dried and the electrical properties of the surfaces are examined by contacting small areas of each treated film surface with a series of reference surfaces to be hereinafter described. The film surfaces are then sprayed with negatively and positively charged colored powders of the type described below to determined the sign and intensity of the charge developed. Cetyltrimethylammonium bromide is the preferred surface-active alkyl quaternary ammonium compound, but dimethyldialkylammonium chloride wherein the alkyl groups have from 8 to 18 carbon atoms and stearamidopropyl-dimethyl-$\beta$-hydroxyethyl ammonium nitrate are also useful.

An important electrical property of a surface is its position in a triboelectric series and a technique was found to measure this property. Thirty-six reference surfaces were selected including various photographic emulsions coated on film base, e.g., paper, aluminum foil, cellulose acetate film base, polyethylene terephthalate film base and various polymers and copolymers coated on a film base including a urea-formaldehyde resin, polyvinyl alcohol, polyacrylamide, polymethyl methacrylate, vinylidene chloride/vinyl acetate, vinylidene chloride/acrylonitrile, polyethylene terephthalate/sebacate, polyisobutyl methacrylate, cellulose nitrate, carboxymethylcellulose, hydroxyethyl cellulose, methyl cellulose and gelatin.

The thirty-six reference surfaces were tested as described below to determine their triboelectric order. The tested reference surfaces were then assigned a number 1 to 36, 1 being the most negative (−) reference surface and 36 the most positive (+) reference surface. Any unknown surface when tested in a similar manner is either positive or negative with respect to a particular reference surface. The unknown surface can be placed in any of the thirty-seven positions available in the triboelectric series, zero being the extreme negative position in the series and 36 being the extreme positive position. For example, a surface which is negative to the number 1 reference surface would be assigned the position of zero. If the surface was positive with respect to surface number 1, it would be assigned a position of 2 to 36 depending on results of the test. To determine the triboelectric position, a sample film having both surfaces essentially identical was exposed to the radiation from a polonium strip in order to remove any static charges initially present. Then the series of pairs of reference surfaces, each being in the form of ¼-inch square samples, were held in contact with the test sample for a few minutes by means of spring-loaded clamps, so that each one of a pair of reference samples was clamped on opposite sides of the test sample. After removal of the series of reference samples, the test sample was sprayed wtih a mixture of oppositely charged particles of fluorescent pigments. For example, a specific mixture contained negatively charged green particles and positively charged magenta particles similar to those mentioned in the description under the illustration at page 100 of the magazine "Modern Plastics," May 1951. Such particles are also disclosed in Switzer et al. U.S. Patent 2,498,592. Spraying such a mixture caused a predominance of green particles to adhere to positively charged areas of the test sample and a predominance of magenta particles to adhere to negatively charged areas of the test sample. If all 36 of the small areas of the test sample which had been contacted with the small reference surface samples predominately attracted negatively charged green particles, the test sample was assigned triboelectric position 36 (extreme positive position in the series). If none of the small area predominately attracted green particles but attracted positively charged magenta particles instead, the test sample was assigned a triboelectric position of zero (extreme negative position in the series). A test sample assigned a position of 20 would have predominately attracted green particles to 20 of the small areas and predominately attracted magenta particles to the remaining 16 small areas which had been contacted with the series of reference samples. The density of powder deposited gave an approximately quantitative measure of charge intensity, which is herein classified as very low, low, moderate or high.

It may be desired to measure the triboelectric position of one surface of an element, e.g., the back surface of a support bearing a photographic emulsion on the front surface. The two surfaces of the element were freed of any initial charges by exposure to radiation from a polonium strip. Two such elements were then attached front to front, the combination element re-exposed to radiation from a polonium strip and the reference samples were clamped to the back surfaces of the element so that measurements could be carried out as described above.

For photographic purposes, a more important electrical property of a surface is related to its behavior in use. In order to obtain information relating to use, various photographic film base samples and appropriate controls were coated with a high-speed, cine, gelatino-silver halide emulsion, dried, slit to 35 mm., and perforated for camera evaluation at low humidity. A roll of approximately 100 linear feet of 35 mm. film was conditioned for about 100 hours at 16% relative humidity. It was then placed in the unwind position of the film magazine of a Mitchell (35 mm.) camera, threaded through the camera and started on the rewind. The camera was run at 24 frames/second (90 feet/minute). The test was run in total darkness after the observer had sufficient time for dark adaptation of his eyes. All parts of the camera were opened to facilitate observation of static sparks. Such sparks could be observed at the rewind or on the film running between the rewind and the lightlock between the camera and the film magazine. At one extreme of behavior was found the uncoated, untreated polyethylene terephthalate photographic film base such as is described in Alles U.S. Patent 2,779,684. This film base had no measurable conductivity and was at the far negative (zero) end of the triboelectric scale. In the camera test this untreated film base showed spark discharge between the roll winding up and the metal rewind spool at the beginning of the run, followed by brush discharges from the roll into space, flashes in the plane of the film between the camera and the rewind, and in the camera itself, and sparks between the roll and the film being wound. In addition, a moderately bright glow of the rewound roll itself was observed which persisted for a few seconds after the camera was stopped. For purposes of comparison, this material was given a rating number of 10.

At the other end of the arbitrary scale, with a rating number of 0 to 0.5, was cellulose triacetate photographic film base also coated with the high-speed, cine, gelatino-silver halide photographic emulsion. No sparks were observed in the camera test under ordinary conditions, although introduction of a new ground in the system (the operator's finger) infrequently gave a faint spark discharge. Occasionally the rewound roll was observed to have very faint glow. On the basis of this camera testing, always carried out in a dry room maintained at a relative humidity of about 16%, arbitrary numbers on a scale of 0 to 10 were assigned to the various materials tested.

The invention will be further illustrated by but is not intended to be limited to the following examples in which the following stock solutions were used for treating the film surfaces:

Acid solution A—
    Sodium dichromate dihydrate _____ g__ 16
    Sulfuric acid, 96.5% _____ g__ 294
    H₂O _____ ml__ 40
Acid solution B—
    Sulfuric acid, 96.5% _____ g__ 294
    H₂O _____ ml__ 50

EXAMPLE I

A six-inch web of uncoated polyethylene terephthalate photographic film base, stretched, heat-set and heat-relaxed as described in Example I of Alles U.S. Patent 2,779,684, was treated on one surface with a chromic acid/sulfuric acid solution as described in Example XIV of assignee's U.S. Patent 3,035,915, issued on May 22, 1962, to provide a surface adhesive to a photographic emulsion. The back surface of the film was rendered hydrophilic by treating it with Acid solution A for 5 seconds at 25° C. After the above treatment the back surface was washed in a tap water quench bath of about 15° C. for 35 seconds, was spray rinsed with tap water for 20 seconds and air squeegeed to remove most of the water. The still-wet back surface was treated for 15 seconds in a 0.1% by weight aqueous solution of the polyamine hydrophilic cationic polymer prepared as follows: In a glass jacketed autoclave with double wall to maintain the vapor pressure and equipped with a mechanical agitating means and a thermoelectric couple, are mixed 17.85 parts of methylamine, 366 parts of polyethylene glycol dichloride 600, 385 parts of ethylene glycol and 121 parts of sodium carbonate. The mixture is heated to 128° C., and is maintained at this temperature for three and one-half hours. The internal pressure in the autoclave goes from 2.45 to 3.15 kg./sq. cm. (The vapor pressure in the jacket never exceeds 1.82 kg./sq. cm.) At the end of three and one-half hours of reacting, the percentage of ionic chloride contained in a sample of the mixture is tested, and it is observed that 93.7% of the polyethylene glycol dichloride 600 has reacted with the amine. 825 parts of water are added to the mixture after cooling to 80° C., so as to dissolve the salts and separate them in the aqueous layer. The temperature of the mixture after addition of the water is brought to 90° C., the agitation is stopped, and the mixture is allowed to settle for one hour and one-half to allow the product to decant. In four hours 453 parts of water and dissolved salts are removed. They are replaced by an equal weight of water so as to obtain a 20% active solution of tertiary polyamine. The solution is clear and straw-yellow in color. The excess was removed by spray rinsing for 20 seconds with water. The treated film was then air squeegeed and air dried.

EXAMPLE II

Example I was repeated except that the back surface of the film base, prior to the treatment with the cationic polymer described in Example I, was rendered hydrophilic by the Acid solution A treatment of Example I followed by a 15-second treatment with a 20% aqueous solution of NaOH, a 20-second spray rinse and air squeegeeing.

EXAMPLE III

The back surface of the polyethylene terephthalate photographic film base described in Example I was rendered hydrophilic by treating it with Acid solution B for 5 seconds at 25° C., washing in a tap water quench bath of about 15° C. for 35 seconds, spray rinsing with tap water for 20 seconds and air squeegeeing to remove most of the water. While still wet, the film base was further treated for 15 seconds in an aqueous solution containing 5% by weight sodium hydroxide and 0.05% by weight of the cationic hydrophilic polymer described in Example I. Excess solution on the film surface was removed by spray rinsing with water for 30 seconds, followed by air squeegeeing and drying in air.

EXAMPLE IV

The back surface of a polyethylene terephthalate photographic film as described in Example I was treated for 15 seconds in an aqueous solution containing 5% by weight sodium hydroxide and 0.05% by weight of the cationic hydrophilic polymer described in Example I. The cationic, polymer treated surface was spray rinsed for 20 seconds, air squeegeed and dried in air.

EXAMPLE V

A dimensionally stable polyethylene terephthalate film base coated with a vinylidene chloride/methyl acrylate/itaconic acid polymer, as described in Example IV of Alles, U.S. Patent 2,779,684, was coated on both sides with gelatin solutions in a conventional manner so as to result in a backing layer having a gelatin coating weight of 7 milligrams per square decimeter and on the opposite side a gelatin substratum of coating weight 0.5 mg./dm.² This coating served as a control, having static protection in the form of a layer of appreciable thickness.

The photographic film bases, treated to alter the electrical properties of their back surfaces as described in Examples I through V, were coated on their emulsion-receptive sides with a high-speed cine gelatino-silver iodobromide photographic emulsion containng 3.4% silver iodide, conditioned for about 100 hours at low relative humidity, 16%, and tested to determine the triboelectric positions of their back surfaces, the intensity of charges generated and their relative behavior of use in a camera, e.g., by viewing static sparks in parts of the camera, as described above. Untreated, uncoated polyethylene terephthalate photographic film base described in Example I of Alles U.S. Patent 2,779,684 was used as an additional control. The results are summarized as follows:

*Table I*

| Film | Triboelectric Position | Charge Intensity | Relative Behavior in Camera |
|---|---|---|---|
| Control, untreated and uncoated polyethylene terephthalate film. | 0 | high | 10 (extremely high static). |
| Emulsion coating on Ex. I base. | 0 | low | 0 (no static observable). |
| Emulsion coating on Ex. II base. | 5 | low | 2. |
| Emulsion coating on Ex. III base. | 3 | low | 1.5. |
| Emulsion coating on Ex. IV base. | 2 | low | 1.5. |
| Emulsion coating on Ex. V base. | 36 | moderate | 1. |

In the above table, it is noted that the treatments of Examples I through IV result in low charge intensities over the whole triboelectric series, that is, only small static charges are developed when the treated surface is contacted with a wide variety of reference materials, e.g., paper, aluminum foil, various film bases and film bases coated with various polymers and copolymers as were previously described above. This improvement in static characteristics is also shown by the relative behavior in a camera at low humidity. The gelatin backing (Example V) gave good results in the camera even though moderately intense charges were found in testing because it is a near triboelectric match for gelatin emulsions. It was not possible, however, to make satisfactory splices, as required of motion picture films, without first going through the time-consuming operation of scraping off the gelatin backing. Good dielectric splices, without scraping the backing, were made by the procedure described in the "Journal of the Society of Motion Picture and Television Engineers," vol. 66, January 1957, pages 14 to 16, utilizing the films of Examples I to IV.

EXAMPLE VI

In order to provide a more permanent antistatic treatment, a crosslinking agent was employed. A mixture was made containing 44.4 g. of a 20% aqueous solution of cationic hydrophilic polymer described in Example I, 4.44 g. of a crosslinking agent prepared by condensing epichlorohydrin with glycerine and 348 ml. H$_2$O. The solution was filtered at this point to remove an insoluble portion of the crosslinking agent. The pH was then adjusted to 3.6 by the addition of 7 N HCl and the solution was heated to 80° C. for 10 minutes. The solution was cooled rapidly to room temperature, and was used within eight hours of preparation by dilution of 44.6 ml. to 1 liter with distilled water (making a solution 0.1% of the cationic hydrophilic polymer).

A 5-inch by 10-inch sample of polyethylene terephthalate photographic film base as described in Example I of Alles U.S. Patent 2,779,684 had both surfaces rendered hydrophilic by dipping for 15 seconds at 25° C. in Acid solution A, quenching for 15 seconds in tap water and rinsing for 2 minutes in distilled water. The still-wet film was then immersed for 5 minutes at room temperature in the solution described in the first paragraph of this example, washed with distilled water for 1 minute, and dried at room temperature. The sheet of photographic film base (without being coated with photographic emulsion) was then subjected to a typical cine black and white photographic processing treatment consisting of the usual development, rinse, fix, final wash, and drying. Samples taken before and after this processing treatment were tested by contacting at low humidity with a number of test surfaces described in Example V and spraying with a mixture of oppositely charged powders, e.g., green (−) and magenta (+), to determine the intensity and sign of charge developed as described earlier above.

The unprocessed sample of this film was found to have a triboelectric position of 36 (positive end of the scale) with a moderate charge intensity. The processed sample was found to have a triboelectric position of 36 with low to moderate charge intensity.

The treatment of the 5-inch by 10-inch sample of film base was repeated except that the cationic hydrophilic polymer solution described in Example I was used with no crosslinking agent present. After processing similar to that described above in this example, a high charge intensity at a triboelectric position of zero was observed.

By varying the ratio of the cationic hydrophilic polymer to cross-linking agent, the triboelectric position of film base samples after processing was controlled. A polymer to crosslinking agent ratio of 2 to 1 gave a triboelectric position of 36 (positive), a 4 to 1 ratio gave a triboelectric position of 29, and an 8 to 1 ratio gave a triboelectric position of zero (negative).

EXAMPLE VII

A 5-inch by 10-inch sample of polyethylene terephthalate photographic film base as described in Example I of Alles U.S. Patent 2,779,684 was immersed in Acid solution B for 5 seconds at 25° C., quenched in tap water for 15 seconds and rinsed for two minutes in distilled water. The still-wet film was soaked for 5 minutes at room temperature in an antistatic solution. This solution was made up by heating for two hours at 90° C. a mixture containing 35.0 g. of a 20% aqueous solution of the polyamine cationic hydrophilic polymer described in Example I and 6.7 g. of polyethylene glycol diiodide, crosslinking agent, followed by dilution of 6.0 g. of the heated mixture to 946 ml. with distilled water to make a treatment solution of approximately 0.1% content of cationic polymer. The treated film was washed and dried as described in Example VI and was then subjected to the processing treatment also as described in Example VI.

The above procedure of this example was repeated except that the antistatic solution was made up by heating for two hours at 90° C., 35 g. of a 20% aqueous solution of the polyamine cationic hydrophilic polymer with 0.3 ml. of 37% aqueous formaldehyde followed by dilution of 5 g. of the heated mixture to 946 ml. with distilled water. The following results were obtained:

*Table II*

| Agent | Triboelectric Position | Charge Intensity |
|---|---|---|
| Polyethylene glycol diiodide | 0 | low to moderate. |
| Formaldehyde | 0 | Do. |

EXAMPLE VIII

To antistatic solutions as described in the first paragraph of Example VI, containing two parts of the cationic hydrophilic polymer described in Example I to one part of the cross-linking agent described in Example VI, were added the percentages by weight of cetyltrimethylammonium bromide based on the amount of the cationic polymer indicated below. Samples of film base, rendered hydrophilic on both surfaces as in Example VI, were immersed in these solutions for 5 minutes at room temperature, washed with distilled water for 1 minute, and dried at room temperature. The electrical properties measured are reported in the following table:

*Table III*

| Sample | Cetyltrimethylammonium Bromide Concentration (percent by weight) | Triboelectric Position | Charge Intensity |
|---|---|---|---|
| 1 | 0.50 | 0 | Moderate. |
| 2 | 0.15 | 4 | Low. |
| 3 | 0.07 | 10 | Very low. |
| 4 | 0.03 | 34 | Low. |
| 5 | none | 36 | Moderate. |

These effects are graphically illustrated in the figure which constitutes a part of the specification. In the figure, the electrical characteristics are plotted against the ratio of cetyltrimethylammonium bromide to the cationic hydrophilic polymer described in Example I. The triboelectric position is indicated along the left-hand margin (solid curve) and the intensity of the generated charge is indicated along the right-hand margin (dashed curve). It is seen from the figure that the minimum intensity of static changes was obtained at a ratio of approximately $.07 \times 10^{-2}$. This minimum is accompanied by a sharp change in triboelectric position from the negative to the positive end of the scale. Satisfactory antistatic characteristics are obtained over a range of cetyltrimethylammonium bromide concentration from about 0.03 to 0.15% by weight based on the cationic hydrophilic polymer concentration. The concentration of cetyltrimethylammonium bromide in the treatment solution is about 0.5 to 1 part per million.

EXAMPLE IX

A six-inch by ten-inch sheet of dimensionally stable polyethylene terephthalate photographic film base coated with a vinylidene chloride/methyl acrylate/itaconic acid copolymer, as described in Example IV of Alles U.S. Patent 2,779,684, was immersed for five seconds in the solution of cationic hydrophilic polymer and epoxide crosslinking agent described in the first paragraph of Example VI. The treated film surface was rinsed thoroughly with water and was air-dried. After this treatment, the film base surface showed a triboelectric position of 36, whereas the triboelectric position of the surface prior to the above-described treatment was determined to be zero. The treatment reduced the intensity of charge from a rating of high to moderate. The treated sheet of film base was subjected to the photographic processing treatment described in Example VI and was found to have the same electrical properties as prior to the processing treatment, indicating that the adsorption was permanent.

Sheets of the copolymer coated film base described above in this example were treated with solutions containing cetyltrimethylammonium bromide according to the procedure described in Example VIII. Treatment with a range of the bromide compound at concentrations of from 0.03% to 0.10% based on the weight of the cationic hydrophilic polymer described in Example I gave low to vary low charge intensities.

EXAMPLE X

Three six-inch by ten-inch sheets of commercially available polycarbonate film base (the polycarbonate of 2,2-bis-p-hydroxyphenyl propane), 5.0 mils in thickness, were tested to determine if their surfaces could be altered in electrical properties according to this invention. With no treatment, the film base surface was found to have light to moderate charge intensity at a triboelectric position of 15. When the film base was immersed in Acid solution A for 5 seconds at 25° C., quenched in tap water for 15 seconds, rinsed for 2 minutes in distilled water, air squeegeed and dried, the charge intensity increased to moderate to heavy at a triboelectric position of zero. A third sheet of film base was given the acid treatment, quench and rinse just described but, while still wet, was immersed for 4 minutes in a solution containing 1 g. of the cationic hydrophilic polymer described in Example I in 1 liter of water. This third sheet of film base was then washed for 1 minute in distilled water and then dried in air. Its charge intensity increased to heavy at a triboelectric position 36.

EXAMPLE XI

The reaction product of a commercially available polyethylene glycol dichloride with an average molecular weight of about 600 and triethylenetetramine, was made by mixing 3.62 g. of triethylenetetramine, 61.0 g. of the dichloride and 8.4 g. of sodium bicarbonate, and heating the mixture at about 110° C. for three hours, then at about 150° C. for two hours. A treatment solution was made up by dilution of 1.1 g. of the reaction mixture to one liter with distilled water (approximately 0.1% active ingredient).

Similarly, a treatment solution was made up by dilution to one liter of 1.09 g. of the reaction product of 3.76 g. of tetraethylenepentamine, 61.0 g. of the polyethylene glycol dichloride described above and 8.4 g. of sodium bicarbonate. Materials similar to these reaction products are disclosed in Belgian Patent 554,506.

Another treatment solution was made containing 0.1% by weight in water of the cationic antistatic copolymer of Example I of Upson and Webers, U.S. Patent 2,831,781.

Three five-inch by ten-inch samples of polyethylene terephthalate photographic film base as described in Example I of Alles, U.S. Patent 2,779,684, were immersed in Acid solution B for 15 seconds at 25° C., immersed in tap water for 15 seconds, and rinsed one minute with flowing ditsilled water. They were then immersed in a 20% by weight aqueous solution of NaOH for one minute, and rinsed again with flowing distilled water for one minute. Each of the three cationic, hydrophilic, polymer solutions described above was used for treatment (15-second immersion) of a piece of this base. The base was then rinsed for sixty seconds in flowing distilled water and dried. The electrical properties measured are reported in the table below:

Table IV

| Agent | Triboelectric Position | Intensity |
|---|---|---|
| Polyethylene glycol dichloride/triethylenetetramine. | 0 | Low. |
| Polyethylene glycol dichloride/tetraethylenepentamine. | 0 | Low. |
| Antistatic of Ex. I, U.S. Patent 2,831,781 | 0 | Low. |

The electrical resistance of these coatings was measured at 40% relative humidity and was found to be greater than $10^{15}$ ohms per square. A sample of a coating of appreciable thickness (approximately 4 mg./ft.$^2$) of the antistatic of Example I of U.S. Patent 2,831,781 applied as in Example III of that patent, was found to have an electrical resistance of $8 \times 10^{10}$ ohms per square at 40% relative humidity. The thickly coated film surface was found to have a triboelectric position of 36 with an intensity (measured at 15% relative humidity) rated as high. This illustrates again the importance of securing an adsorbed molecular layer, rather than a coating of appreciable thickness for static protection at low relative humidity.

EXAMPLE XII

Six-inch by ten-inch samples of polyethylene terephthalate photographic film base as described in Example I of Alles, U.S. Patent 2,799,684, were rendered hydrophilic by being immersed in Acid solution A for 15 seconds at 25° C., immersed in tap water for 15 seconds, and rinsed one minute with flowing distilled water. One sample was treated further by immersing for one minute in a 0.1% solution of decationized gelatin in water, by washing for one minute in flowing distilled water, and drying. This sample gave a triboelectric position of 3 with a moderate intensity of charge. Another sample of hydrophilic base was treated further by immersing for one minute in a 0.1% solution of the cationic antistatic of Example I of Upson and Webers, U.S. Patent 2,831,781, by washing for one minute in flowing distilled water and drying. This gave a triboelectric position of 4 with a low charge intensity. A third sample of hydrophilic base was immersed in a 0.1% aqueous solution of poly(acrylic acid co diethylaminoethyl methacrylate, 50/50, molecular proportions), washed with flowing distilled water, and dried. This gave a triboelectric position of 4 with a low intensity of charge. All of these base samples had electrical resistance greater than $10^{15}$ ohms per square.

In Examples VI, VII, VIII, IX, XI, and XII above, film bases were treated to provide static protection on both film surfaces. The treatments described in the above examples, however, can be applied to one film surface only, the opposite surface being coated with a photographic gelatino-silver iodobromide emulsion over an adhesive substratum as disclosed in Example V. The resultant film elements had satisfactory static protection.

The procedure of imparting static protection is not limited to cine negative elements but may be applied to films bearing emulsions of other silver halides, e.g., silver bromide, silver chloride, silver chlorobromide, etc. By this procedure, satisfactory static protection can be provided for such products as single side X-ray films, films for color photography in which emulsions contain color formers or in which color formers are to be supplied in the processing solutions, graphic arts and lithographic films, motion picture positive films, etc.

The emulsion binders for such films may include, in place of or in addition to gelatin, any of the usual binders, e.g., polyacrylamides, polyglycuronic acids, agar-agar, zein, collodion, water-soluble cellulose derivatives, such as substantially hydrolyzed cellulose acetate, cellulose esters of hydroxy monocarboxylic acids, e.g., lactic or glycolic acids, alkali metal salts of cellulose esters of dicarboxylic acids, such as phthalic acid; polyvinyl alcohol, partially hydrolyzed polyvinyl acetate and interpolymers thereof with unsaturated materials, such as styrene, maleic acid, etc.; water-soluble polyvinyl acetals and other hydrophilic synthetic or natural resins and polymeric compounds. Suitable hydrophilic colloids of the above types are described in the United States Patents 2,110,491, 2,276,322, 2,276,323, 2,286,215 and 2,211,323. Also, mixed emulsion binders may be used, e.g., gelatin plus polyvinyl lactams, dextran, polyvinyl acetals, etc.

This invention is not limited to altering the electrical properties of only the surfaces described in the preceding examples. The process is applicable to shaped articles, e.g., films, and particularly films of macromolecular organic polymers, which contain acid groups or salts of acid groups, and in particular carboxylic groups in the surface. Typical macromolecular organic polymers to which the process is applicable include those composed of any of the high-melting, difficultly soluble, usually microcrystalline, cold-drawing linear, highly polymerized esters of terephthalic acid and glycols of the series HO(CH$_2$)$_n$OH, where $n$ is an integer within the range of 2 to 10, described in Whinfield et al., U.S. Patent 2,465,319. Other useful polyester films which can be treated include those prepared from highly polymerized esters of terephthalic acid and at least one glycol of the formula

HOCH$_2$—W—CH$_2$OH where W is polymethylene or alkyl-substituted polymethylene of 0 to 8 carbons, e.g., 2,2-dimethylpropylene-1,3 or a cycloalkylene radical of 5 to 6 carbon atoms, e.g., cyclopentyl-1,3, and cyclohexyl-1,4. In addition, copolyester films prepared comprising up to 85 mole percent isophthalic acid and 15% or more of terephthalic acid components such as are disclosed in British patent specification 766,290 can be used. Films comprising up to 20 mole percent of aliphatic dicarboxylic acids based on total moles of acid, e.g., succinic, glutaric, adipic, hexahydroterephthalic and sebacic acids, in addition to at least 15 mole percent terephthalic acid are also useful.

The material to be treated may originally contain these acid or salt groups in their surface or an intermediate treatment may be given the materials to form such groups in its surface. For example, the materials can be treated with acid, e.g., chromic acid, sulfuric acid, or alkali, e.g., sodium and potassium hydroxide, to cause hydrolysis of ester linkages. The treatment time depends on the particular film, the treatment solution, concentration and temperature of said solution, etc. The treated film is washed to remove excess treatment solution.

The preferred shaped articles are made from polyesters as described above, but this invention is not limited solely to treating polyesters. Other materials can be used to make the shaped articles so long as the shaped article or its surface contains acid groups or salts of acid groups, preferably carboxylic groups. For example, if the shaped article is coated with a layer of a vinylidene chloride/methacrylate acrylic ester/itaconic acid copolymer as described in Alles and Saner U.S. Patent 2,627,088, the film base can be cellulose acetate, cellulose triacetate, cellulose acetate propionate, cellulose acetate butyrate, polyvinyl chloride, polyvinyl chloride/acetate, polyvinyl acetals, e.g., from formaldehyde and acetaldehyde, etc. Polyalkylacrylates make useful shaped articles if carboxyl groups are formed on their surface, e.g., by alkaline hydrolysis with NaOH, etc., or by chromic acid oxidation.

Although the invention finds particular utility in the treatment of film bases, it could equally well be applied to other shaped articles meeting the requirements of the type of surface. Thus, the electrical properties of fibers or woven textile materials could be altered in this manner.

There is considerable latitude in the choice of the material to be adsorbed to the surface in a monomolecular layer. It is only required that the compound to be adsorbed be a polymer which is both cationic and hydrophilic and contains a basic nitrogen atom capable of forming a salt with an anionic group. Polyamines such as are disclosed in Belgian Patents 554,506, granted February 15, 1957, and 560,446, granted September 14, 1957, are useful. In general, the polyethylene glycol dihalide (e.g., chloride, bromide or iodide) analogue is condensed (with release of hydrogen halide) with an amine, the nitrogen of which has at least two active hydrogens. Typical of such amines are methylamine, ethylamine, propylamine, butylamine, amylamine, hexylamine, dodecylamine, allyl-amine, monoethanolamine, 3-isopropyl-n-propylamine, 3-methoxy-n-propylamine, diethylenetriamine, bis(3-aminopropyl)amine, bis(2-aminopropyl)amine, hexamethylene diamine, triethylenetetramine, tetraethylenepentamine, etc. In addition to the materials disclosed in the above Belgian patents, it would be possible to use any of the following materials: polydiethylaminoethylmethacrylate tertiary and quaternary salts, polyvinyl pyridinium salts and polyethylene imine. Polymers and copolymers disclosed in the following U.S. patents are useful as the antistatic material: Webers U.S. Patent 2,676,166; Barney U.S. Patent 2,677,699; Cupery et al. U.S. Patent 2,720,511; Shacklett U.S. Patent 2,777,872; Cupery U.S. Patent 2,781,355; and Shacklett U.S. Patents 2,834,758 and 2,846,417.

A number of crosslinking agents could be used satisfactorily to provide permanence of adsorption to the surface. Such materials include dihalides, diisocyanates, formaldehyde, glyoxal and mucochloric acid, and preferably diepoxides and polyepoxides. Such polyepoxides can be prepared by condensing epichlorohydrin with a polyol such as glycerine or polyethylene glycol. A typical example is the condensation product (with elimination of HCl) of glycerine with epichlorohydrin. A polyepoxide with a molecular weight of between about 280 to 360 is available commercially under the trademark "Eponite 100" (viscosity 90–150 cp. at 25° C.; density, 10.2 lbs./gal.) from the Shell Chemical Corp., 500 Fifth Avenue, New York, N.Y. Other commercial products from the same source include "Epon" resins which are diepoxide condensation products of epichlorohydrin and dimethyl, di-para hydroxyphenyl methane and the poly-(allyl glycidyl ethers). A useful siloxane diepoxide is 1,3-bis-[3-(2,3 - epoxy propoxy)propyl] tetramethyldisiloxane sold under the trademark "Syl-Kem" 90 by Dow Corning Corp., Midland, Michigan.

It is preferred that the crosslinking agent be water soluble for ease in application, e.g., as are the polyepoxides, formaldehyde, etc. Satisfactory results are obtained by using water-insoluble materials, however, such as the condensation product of epichlorohydrin with dimethyl di-(p-hydroxy phenyl) methane. These materials require the use of organic solvents for both preliminary reaction of the hydrophobic polymers and also for the adsorption step. It is possible to secure a water-soluble product by partial reaction of a small quantity of diepoxide with, for example, an aminopolyether in an organic solvent. This, however, would require an isolation step before the adsorption step using water as the solvent.

It was generally noted that processed strips previously treated with a cationic hydrophilic polymer/crosslinking agent often showed the generation of lower static charges than corresponding unprocessed strips. This phenomena suggested that improved results might be obtained if less of the antistatic material were adsorbed to the base. It was found that improved results were obtained by competition of other cationic reagents for adsorption sites on the hydrophilic surface. It is possible to use a number of cationic reagents where it is desired to provide competition for adsorption sites. Cetyltrimethylammonium bromide as described in Example VIII, is preferred, but the following materials can also be used, e.g., straight chain alkyl quaternary ammonium salts of 8 to 30 carbon atoms, stearamidopropyl dimethyl-β-hydroxyethylammonium salts, e.g., the nitrate or dihydrogen phosphate, and straight chain alkyl pyridinium salts. Of the ammonium salts, quaternary salts are preferred since they remain ionized and adsorbed over a wide pH range, but primary, secondary or tertiary amine salts can be used if the treated base will not be exposed to alkaline solutions.

This invention is useful for altering the electrical properties of a film surface and in particular photographic film base surfaces. Such altered film surfaces have appreciably reduced static susceptibility which is particularly effective at low relative humidities. The altered film surface also is protected from static formation when the surface is brought into contact with surfaces occupying a wide variety of positions in the triboelectric series. The static-protected films are useful for all photographic purposes and are particularly useful as cine films due to their improved static qualities and their ease in splicing.

A specific use for treated films such as the third sheet of polycarbonate film described in Example X is for the web material useful in the electrostatic printing method described in Hooper U.S. Patent 2,558,900, issued July 3, 1951. In the Hooper patent it is disclosed that a "guide and preconditioning member 15 . . . preferably of some solid, non-corrosive material which, in the Triboelectric series, is negative with respect to paper, as silver." Polycarbonate film base, treated as described above so that it would occupy a position at the extreme positive end of the triboelectric series (36), would be advantageously employed in the process of Hooper since the "guide and preconditioning member 15" could be made of almost any convenient material of construction. Contact with almost any surface would cause the polycarbonate film base, at triboelectric position 36, to acquire a positive charge.

In addition to avoiding the necessity of special materials of construction for the "preconditioning member 15," there is the further advantage that one can print, according to the process of Hooper, on a wide variety of web materials which could not be employed in their normal condition. Thus, untreated and uncoated polyethylene terephthalate film base, shown in the first line of Table I above to have a triboelectric position of zero, could not readily acquire the necessary positive charge by contact with a "preconditioning member 15" of the type described by Hooper. However, by the process of this invention, polyethylene terephthalate film base can be treated so that it has a triboelectric position of 36 (see Example VI, third paragraph) so that it can acquire a positive charge by contact with almost any other surface.

This invention is advantageous because it provides by means of a quick, simple, economical process films, and in particular photographic film bases, which have static protection under all conditions of use including under low humidity conditions. Another advantage is that such a film does not have to have the adsorbed layer or any coatings removed to make satisfactory splices. Still another advantage is that the static protection can be made permanent or temporary, the former being particularly desirable when the film is photographically processed. A further advantage is that the triboelectric position of the treated film surface can be varied. Still other advantages will be apparent to those skilled in the art.

What is claimed is:

1. A process for altering the electrical properties of a surface of a film having a high surface resistivity without reducing said resistivity below about $1 \times 10^{14}$ ohms per square, said film surface having a plurality of anionic groups, which comprises adsorbing to said surface a cationic, hydrophilic polymer containing at least one basic nitrogen atom per molecule, said polymer having an equivalent weight between about 125 and 3,600 and being capable of forming a salt with said anionic group, reducing the amount of hydrophilic polymer on said surface to an essentially monomolecular layer by washing said treated surface with an aqueous medium, before drying, thereby removing non-adsorbed polymer and weakly adhering polymer and drying.

2. A process for altering the electrical properties of a surface of a film as defined in claim 1 wherein said cationic, hydrophilic polymer is a polyamine of the formula:

H[—X—CH$_2$CH$_2$—(OCH$_2$CH$_2$)$_m$—O—R—O—(CH$_2$CH$_2$O)$_n$—CH$_2$CH$_2$]$_p$—X—H wherein —R— is a divalent radical taken from the group consisting of unsubstituted alklene radicals, alkylene radicals substituted with at least one group taken from the class consisting of alkyl of 1 to 4 carbon atoms, alkoxy of 1 to 3 carbon atoms, aryl of 6 to 12 carbon atoms, R$_1$CO— where R$_1$ is a hydrocarbon of 1 to 3 carbon atoms, R$_1$COO— where R$_1$ is a hydrocarbon of 1 to 3 carbon atoms, hydroxyl, chlorine and bromine and alkylene radicals interrupted with nitrogen, oxygen and sulfur, and radicals of the formula

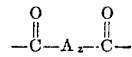

and

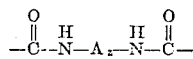

wherein A is a hydrocarbon radical of 1 to 10 carbon atoms and z is a cardinal number of 0 and 1, —X— is a member of the class consisting of

and

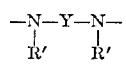

wherein R' is a member selected from the group consisting of hydrogen, alkyl of 1 to 8 carbon atoms and amino lower alkyl and Y is a divalent aliphatic hydrocarbon of up to 8 carbon atoms and a hydrocarbon radical interrupted with at least one member of the group consisting of an intralinear imine and alkyl-substituted imine linkage and divalent hydrocarbon radicals of 2 to 10 carbon atoms terminating in said

and

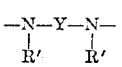

$m$ and $n$ are integers ranging from 3 to 40 and $p$ is an integer no greater than about 10.

3. A process for altering the electrical properties of a surface of a film as defined in claim 1 wherein said cationic, hydrophilic polymer is a polyamine of the formula:

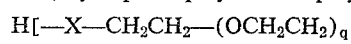

wherein —X— is a member of the class consisting of

and

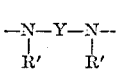

wherein —R' is a member of the class consisting of hydrogen, alkyl of less than about 8 carbon atoms in its longest chain and amino lower alkyl and —Y— is a divalent aliphatic hydrocarbon radical and a hydrocarbon radical interrupted with at least one intralinear imine and alkyl-substituted imine linkage, $q$ being a number from about 6 to about 40 and $p$ being a number no greater than about 10.

4. A process as defined in claim 1 wherein said film is a macromolecular organic polymeric film.

5. A process as defined in claim 4 wherein said film is a polyester film.

6. A process for permanently altering the electrical properties of a surface of a macromolecular organic polymeric film having a high surface resistivity without reducing said resistivity below about $1 \times 10^{14}$ ohms per square, said film surface having a plurality of carboxylic groups, which comprises adsorbing to said surface the polyamine, cationic, hydrophilic polymer of claim 2 and a crosslinking agent taken from the group consisting of a polyepoxide prepared by condensing epichlorohydrin with a polyol of up to 32 carbon atoms, formaldehyde, polyethylene glycol diiodide and polyethylene glycol dibromide, reducing the amount of hydrophilic polymer on said surface to an essentially monomolecular layer by washing said treated surface with an aqueous medium, before drying, to remove non-adsorbed cationic polymer and weakly adhering cationic polymer and drying.

7. A process as defined in claim 6 wherein said polyamine, cationic, hydrophilic polymer is of the formula:

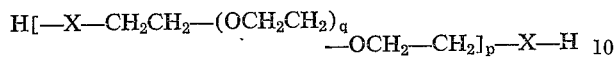

wherein —X— is a member of the class consisting of

and

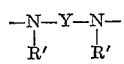

wherein R' is a member of the class consisting of hydrogen, alkyl of less than about 8 carbon atoms in its longest chain and amino lower alkyl and —Y— is a divalent aliphatic hydrocarbon radical and a hydrocarbon radical interrupted with at least one intralinear imine and alkyl-substituted imine linkage, $q$ being a number from about 6 to about 40 and $p$ being a number no greater than about 10.

8. A process as defined in claim 6 wherein said film is a polyester film.

9. A process as defined in claim 6 wherein the ratio of cationic, hydrophilic polymer to crosslinking agent ranges from 1 to 1 to 20 to 1.

10. A process as defined in claim 6 wherein the reaction between said cationic, hydrophilic polymer and said crosslinking agent is partially prior to adsorption to the film surface.

11. A process as defined in claim 6 wherein adsorbed to said surface is a mixture comprising said cationic, hydrophilic polymer, said crosslinking agent and a cationic surface-active alkyl quaternary ammonium compound.

12. A process as defined in claim 11 wherein said ammonium compound is cetyltrimethylammonium bromide.

13. A process as defined in claim 12 wherein said cetyltrimethylammonium bromide is present in amounts of 0.03 to 0.15 percent by weight based on the weight of said cationic hydrophilic polymer.

14. A process for providing a planar surface of a macromolecular organic polymeric film having a high surface resistivity and having a plurality of carboxylic groups with low static susceptibility without reducing said resistivity below about $1 \times 10^{14}$ ohms per square, which comprises adsorbing to said planar surface an antistatic mixture comprising ($a$) the polyamine, cationic, hydrophilic polymer of claim 2, ($b$) a crosslinking agent taken from the group consisting of a polyepoxide prepared by condensing epichlorohydrin with a polyol of up to 32 carbon atoms, formaldehyde, polyethylene glycol diiodide and polyethylene glycol dibromide, and ($c$) a cationic surface-active alkyl quarternary ammonium compound, reducing the amount of hydrophilic polymer on said surface to an essentially monomolecular layer by washing said adsorbed surface with a solvent for said antistatic mixture, before drying, to remove non-adsorbed polymer and weakly adhering polymer and drying.

15. A process as defined in claim 14 wherein said film is a polyester film.

16. A process as defined in claim 14 wherein said film is polyester film bearing a coating of a vinylidene chloride/acrylic ester/itaconic acid copolymer.

17. The film obtained by the process as defined in claim 14.

References Cited in the file of this patent

UNITED STATES PATENTS

| | | |
|---|---|---|
| 2,832,698 | Walles | Apr. 29, 1958 |
| 2,882,185 | Valko et al. | Apr. 14, 1959 |

FOREIGN PATENTS

| | | |
|---|---|---|
| 560,446 | Belgium | Sept. 14, 1957 |